Jan. 27, 1959 V. FLAX 2,870,583
PRODUCTION OF SEALED CONTAINERS FILLED WITH LIQUID
Filed May 21, 1953

INVENTOR.
Valer Flax
BY
ATTORNEY

United States Patent Office 2,870,583
Patented Jan. 27, 1959

2,870,583

PRODUCTION OF SEALED CONTAINERS FILLED WITH LIQUID

Valer Flax, Vic-Fezensac, France

Application May 21, 1953, Serial No. 356,609

6 Claims. (Cl. 53—37)

This invention relates to the production of sealed containers filled with liquid by a process which involves the division of a length of tubing composed of flexible thermoplastic material into a plurality of separate containers by pressing and welding together the opposite walls of the tubing at intervals along its length. The tubing employed may be made by extrusion, or by welding together the edges of one or more strips of material, and it may be of circular or of any other cross section. The nature of the invention will otherwise sufficiently appear from the following description.

A piece of tubing, which may be of any length but for convenience of manufacture preferably measures some tens of yards, is filled for the greater part of its length with the liquid to be enclosed in the containers, a length of, say, a few feet being left unfilled. The tubing is wound up—either before or after filling—upon a storage reel, from which it can be withdrawn progressively as required. The filled extremity of the tubing is placed in open communication with a storage vessel for the liquid, or is closed by a one way valve, so that excess liquid can escape from the tubing as its internal volume is reduced by the formation of the constrictions which separate the individual containers from one another.

The extremity of the unfilled end of the tubing is closed in any suitable manner and led from the storage reel over a raised support, which is preferably mounted for adjustment in the vertical direction. From this support, the tubing is passed downwardly in a direction inclined to the horizontal for a distance of some feet and then passed substantially horizontally between a pair of welding tools.

When the tubing has been so arranged, the previously unfilled end of the tubing becomes filled with liquid, the air which occupied that end of the tubing rising into the part of the tubing which is held raised by the support and occupying a part of the limb of the tubing descending from the support. Thus a few feet of filled tubing adjacent the welding tools is separated by a unfilled length of tubing from the remaining filled part of the tubing, this latter part forming in effect a reservoir which serves to keep filled the end of the tubing presented to the welding tools.

The pressure of the liquid in this short filled section of the tubing which is acted upon by the welding tools is determined by the height of the liquid level in the descending limb of the tubing, so that the constrictions produced by the action of the welding tools do not cause the production of large internal pressures in the tubing and it is possible to make use of relatively thin walled and consequently inexpensive tubing.

After each operation of the welding tools, the tubing is drawn forward and a small quantity of the liquid flows over from the ascending limb of the tubing into the descending limb to replace that which has been enclosed in the newly formed container.

By correctly adjusting the height of the support in relation to the speed at which the tubing is advanced, the liquid level in the descending limb of the tubing can be maintained at a substantially constant height.

In another example the shorter section of the tubing, the extremity of which is to be introduced between the welding tools, will be separated from the longer part of the tubing, also filled with liquid, by flattening a point of the tubing, this flattened length allowing the liquid to overflow in small quantities, step by step, from its longer limb into its shorter limb when the tubing glides forwards, this quantity of liquid being sufficient for maintaining a constant pressure in the shorter limb of the tubing.

This flattening will be obtained when the filled tubing is passed over a support for stopping the free flowing of the liquid between the limb of the filled tubing ascending to the support and the other limb of the tubing, descending from this support for being presented to the welding tools. Preferably, this support will have a rotating roll for controlling the gliding of the tubing at a determined speed, or, this roll can be freely rotatable for adopting the speed of the gliding tubing, being driven in any suitable manner. The proper weight of the two limbs of the tubing filled with liquid will give a sufficient tension for flattening the soft tubing at the point of its passage over the support for pushing away the liquid from this place thus creating two zones of separated volume, being connected only by the flattened sector of the tubing, pressing on the support, representing externally the form of a strip, allowing however, for the liquid to flow in small quantities from the ascending limb of the tubing directed towards the support—this sector of the tubing having the function of a reservoir—into the other limb of the tubing, leaving the support on the opposite side, directed towards the welding tools, the said over-flowing being realised step by step following the advancement of the tubing.

In this example the flattened length, situated between the two filled sectors of the tubing, will contain no air. This operating procedure will be used preferably in filling liquids like shampoo or liquid soap for preventing foam which could be easily produced if the air would not be excluded.

In all other respects the method and apparatus used in the practice of the present invention may be similar to any of those described in the patent application for Letters Patent No. 171,390 of 1950 and No. 340,656 and No. 340,657 of 1953. In particular a pair of clamping jaws for temporarily pressing the walls of the tubing against one another without welding them together may be disposed a short distance in front of the welding tools, these clamping jaws being closed after each advance of the tubing to isolate a short filled length of tubing, from which a container is then sealed off by the action of the welding tools. Also, the welding tools may be so formed as to divide the tubing longitudinally as well as transversely, thereby forming at each operation two or more containers disposed side by side.

For an understanding of the invention principles, reference is made to the following description of typical embodiments thereof as illustrated in the accompanying drawings. In the drawings.

Figure 1:
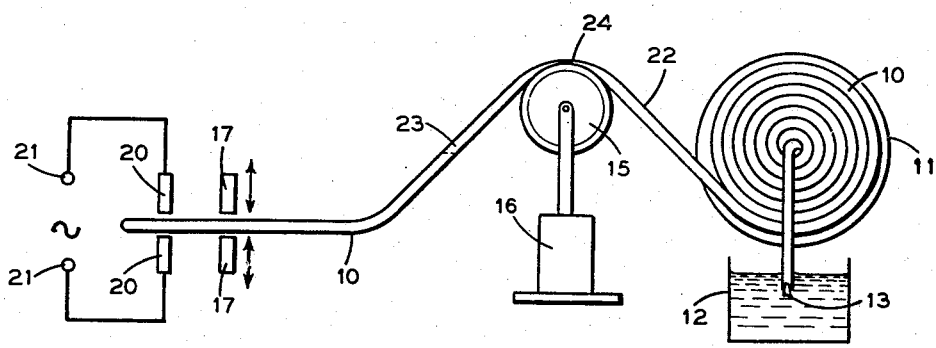
Fig. 1 is a somewhat schematic elevation view of apparatus for practicing the invention.

Referring to Fig. 1, the tubing 10 filled with liquid for the major part of its length is wound upon a rotatable reel 11 with the filled end of the tubing extending axially from the reel 11 and disposed over or in a container 12 for the liquid. This end of the tubing has a oneway valve 13 for allowing escape of liquid, under pressure, into container 12 as the volume of tube 10 is reduced due to formation of the filled and sealed containers.

From reel 11, tubing 10 extends upwardly over a rotatable guide roller 15 mounted on a support 16 adjustable to vary the height of roller 15. Tubing 10 extends downwardly from the other side of reel 11 at an angle to the horizontal, and then is led substantially horizontally between clamping jaws 17 and sealing dies 20 connected to a source 21 of high frequency A. C. potential. The left end of tubing 10 is closed as indicated at 18.

With tubing 10 extending over roller 15, there are provided two inclined legs 22, 23 of the tubing separated by a flattened section 24 at the top of roller 15. Leg 22 is filled with liquid right up to section 24. Leg 23, however, is only partly filled with liquid as the liquid, due to the "head" of leg 23, flows to the left in the tubing and the air is displaced into leg 23 above the liquid level therein.

In forming the individual compartments or containers, clamps 17 are first engaged with the tubing to isolate the "work" section from the remainder of the tubing, maintaining pressure on the liquid in the isolated section. Dies 20 are then engaged with the tubing to seal off one or more individual containers 25. The clamps and the dies (or electrodes) are then released and the tubing drawn a pre-set distance to the left. This causes some liquid from leg 22 to be forced through flattened section 24 into leg 23. Flattened section 24 is maintained flat by the tension on the tubing due to the weight of liquid in legs 22 and 23.

Figure 2:
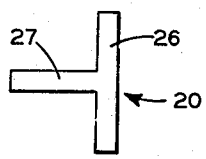
Fig. 2 is a plan view of a preferred form of die.
Figure 3:
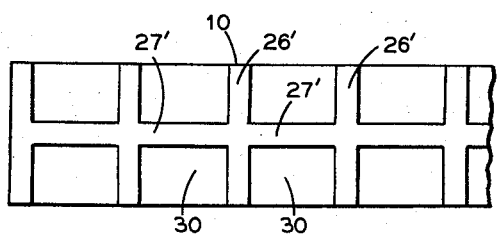
Fig. 3 is a partial plan view of one end of the tubing as processed to form filled and sealed containers.

The dies or electrodes 20 may be designed to seal off one container at a time in the tubing. However, it may be preferred to have the dies seal off two or more containers side by side in the tubing. In such case, the dies may have the T-shaped configuration of Fig. 2 in which the head 26 of the T forms a transverse seam 26' across the tubing and the stem 27 forms a longitudinal seam 27' dividing the sealed off section into two filled containers 30. Such a container arrangement is shown in Fig. 3.

While specific embodiments of the invention have been shown and described in detail to illustrate the application of the invention principles, it will be understood that the invention may be embodied otherwise without departing from such principles.

What I claim is:

1. In a method for producing liquid filled individual containers from continuous partially liquid filled tubing of thermoplastic material which is heat sealed between opposing welding tools; the steps which consist in partially filling with liquid a predetermined length of continuous tubing, mounting one end of said continuous tubing in the zone of opposing welding tools, mounting the remainder of the length of the continuous tubing to dispose the liquid contained in said tubing in two liquid sectors separated by an intermediate gaseous sector, one of which liquid sectors is disposed at the zone of the welding tools, and progressively moving said continuous tubing after each individual container is formed by activation of siad welding tools, the continuous tubing being so mounted that as each successive individual liquid filled container is formed by the welding tools, liquid is displaced from the one liquid sector at the zone of the welding tools into the gaseous medium sector and towards the other liquid sector.

2. A method as claimed in claim 1, wherein the tubing is periodically advanced to the welding tools in which the two separated sectors will be obtained by an angular deviation given to the tubing during its advancement.

3. A method of producing individual containers as claimed in claim 1, wherein the tubing is periodically advanced to the welding tools, and wherein the length of the tubing is directed towards the point of an angular deviation having the function of an elastic reservoir allowing the liquid by the effect of its shortening gradually produced by the advancing of the tubing to overflow in small quantities into the sector leaving the point of deviation towards the welding tools.

4. A method as claimed in claim 1, wherein the height of the column of the liquid filled in the extremity of the tubing which is to be introduced between the welding tools, is limited by the position of the tubing at the level where the tubing is angularly deviated.

5. A method as claimed in claim 2, wherein a small quantity of air is imprisoned into the tubing when the liquid is disposed therein, this air being displaced into and maintained in the highest sector where the tubing is deviated for being kept there during the welding operations.

6. A method as claimed in claim 1, wherein, the tubing partially filled with liquid and containing no air in its highest sector is passed over a support for being flattened by the effect of the proper weight of the filled tubing in view of the separation of the liquid kept in the two sectors of the tubing, hanging on each side of the support.

References Cited in the file of this patent

UNITED STATES PATENTS

| | | |
|---|---|---|
| 636,317 | Von Buhler | Nov. 7, 1899 |
| 2,062,249 | Clearwater | Nov. 24, 1936 |
| 2,185,647 | Penn | Jan. 2, 1940 |
| 2,430,995 | Roos | Nov. 18, 1947 |
| 2,469,975 | McCloy | May 10, 1949 |
| 2,530,400 | Rado | Nov. 21, 1950 |
| 2,607,696 | Kunz | Aug. 19, 1952 |
| 2,663,130 | Donofrio | Dec. 22, 1953 |